Oct. 26, 1965  R. J. GORMAN  3,214,106
CARBIDE TIPPED CHIPPER
Filed Nov. 5, 1962
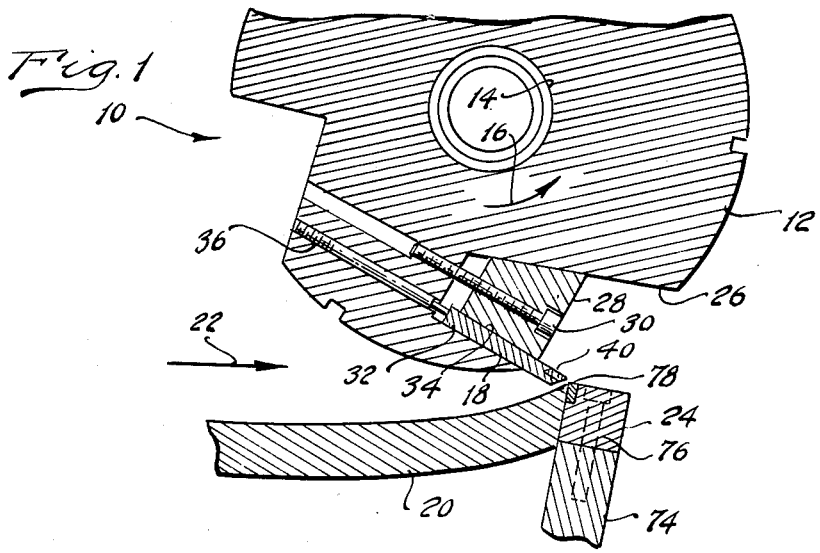
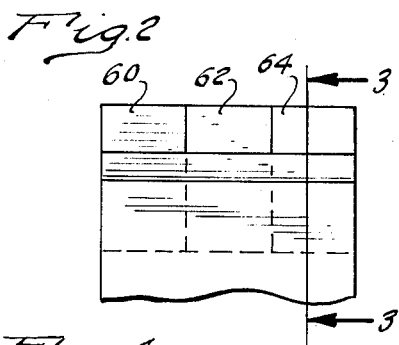
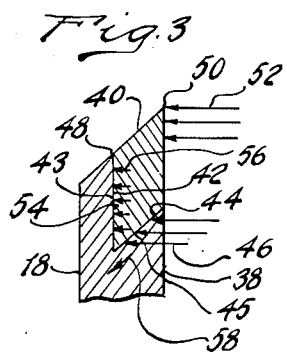
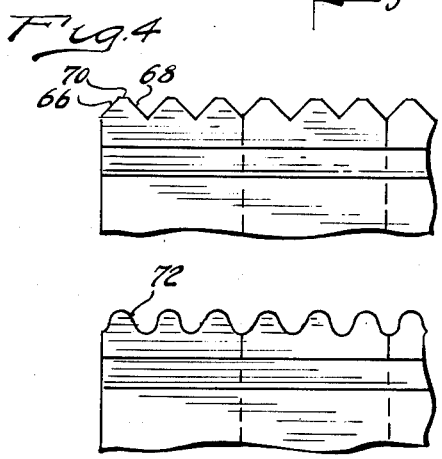
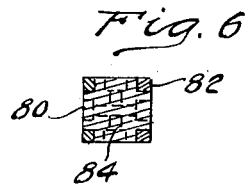
INVENTOR.
RAYMOND J. GORMAN
BY
ATTORNEYS

United States Patent Office 3,214,106
Patented Oct. 26, 1965

3,214,106
CARBIDE TIPPED CHIPPER
Raymond J. Gorman, Birmingham, Mich., assignor to H & G Tool Co., Warren, Mich., a corporation of Michigan
Filed Nov. 5, 1962, Ser. No. 235,196
3 Claims. (Cl. 241—221)

The invention relates to chipping machines for cutting up brush or the like and refers more particularly to a cutter blade for such chippers having a diamond shaped carbide cutting tip secured thereto in a manner to prevent separation thereof from the blade and particularly formed to minimize breakage and replacement.

Chippers of the type concerned with herein include a plurality of elongated cutter blades adjustably secured to a rotating cylinder which cylinder is positioned adjacent a pressure plate so that on rotation of the cylinder brush and other articles fed between the cylinder and pressure plate are cut into small pieces or chips. Such chippers have in the past been provided with elongated solid metal blades and cutter bars. Cutting tips of carbide or other material have not been used on the blades in the past due to the extreme pressures exerted on the tips of the blades in the chipping operation which have a tendency to separate the cutting tips from the body of the blades and cause breaking of the cutting tips.

It is therefore one of the objects of the present invention to provide an improved blade for a brush chipping machine or the like.

Another object is to provide an improved blade for a chipping machine or the like including a carbide cutting tip.

Another object is to provide a blade as set forth above wherein the cutting tip is diamond shaped and is positioned within a recess in the blade body having a reentrant surface.

Another object is to provide a blade as set forth above wherein the cutting tip is serrated at the cutting edge thereof.

Another object is to provide a serrated cutting tip as set forth above wherein the sides of the serrations are at ninety degrees to each other and have flat lands at the juncture thereof.

Another object is to provide a cutting tip as set forth above wherein the serrations are S-shaped.

Another object is to provide a blade as set forth above wherein the cutting tip is elongated and comprises a plurality of separate individual replaceable sections.

Another object is to provide a blade as set forth above wherein the cutting tip is provided in individual sections, is serrated and the serrations terminate at the edge of each section after a full serration.

Another object is to provide a brush chipper or the like having a carbide tipped cutter blade and cutter bar.

Another object is to provide a rectangular cutter bar for use with a brush chipper having carbide cutting edges at each edge thereof.

Another object is to provide a brush chipper or the like having an improved cutter blade and cutter bar which is simple in operation, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a partial section view of a chipper including a cutter blade and cutter bar constructed in accordance with the invention.

FIGURE 2 is an elevation view of a cutter blade constructed in accordance with the invention.

FIGURE 3 is a section view of the cutter blade illustrated in FIGURE 2 taken substantially on the line 3—3 in FIGURE 2.

FIGURE 4 is an elevation view of a modified cutter blade illustrating a serrated tip.

FIGURE 5 is an elevation view of another modification of the cutter blade illustrated in FIGURES 2 and 3 which is provided with a tip serrated differently from the tip shown in FIGURE 4.

FIGURE 6 is a section view of a modification of the cutter bar illustrated in FIGURE 1.

With particular reference to the figures of the drawing one embodiment of the invention will now be considered in detail.

As shown in FIGURE 1 chippers 10 of the type under consideration include a cylinder 12 mounted for rotation with shaft 14 which is driven in the direction of arrow 16. Cylinder 12 includes a plurality of blades 18 secured thereto around the circumference thereof and extending longitudinally of the cylinder. In operation, on rotation of cylinder 12, blades 18 engage brush or similar material inserted between the pressure plate 20 and cylinder 12 in the direction of arrow 22 and cut the material into small pieces or chips as the cutter blade 18 moves along the pressure plate 20 toward the cutter bar 24.

Each blade 18 is mounted in a recess 26 in cylinder 12 by means of a wedge block 28 adjustably fastened in the recess 26 by means of bolt 30. Wedging of the blade 18 in recess 26 by wedge block 28 is assisted by a small taper of, for example, one degree between the surfaces 32 and 34 of the blade 18. The position of blade 18 on cylinder 12 may be adjusted before blade 18 is wedged in a preset position by the wedge block 28 by means of the adjusting screw 36.

As more particularly shown in FIGURE 3 the blade 18 of the chipper 10 is a substantially flat elongated blade having a body portion 38 and a cutting tip 40 secured in a recess 42 therein. As shown best in FIGURE 3 recess 42 has a reentrant surface 44.

The cutting tip 40 is symmetrical, is substantially diamond shaped and formed with surfaces 43 and 45 complementary to the surfaces of the recess 42. The cutting tip 40 may be a carbide cutting tip and may be secured to the body portion 38 of the blade by convenient means such as brazing. The body portion of the blade 18 may be metal, such as steel.

The diamond shape of the cutting tip 40 is important in the invention as is the reentrant surface 44 of the recess 42 in which the cutting tip 40 is secured. Thus with the structure shown best in FIGURE 3 the reentrant surface 44 provides relatively large forces represented by the arrows 46 which tend to prevent rotation of the cutting tip 40 about the point 48 on the cross section of the blade 18 due to the relatively large forces applied to the cutting tip 40 during a chipping operation at the cutting edge 50 thereof which are represented by the arrows 52. The forces represented by the arrows 52 are produced between the cutting edge 50 of the cutting tip 40 and the material which is cut by the chipper during rotation thereof as will be evident from consideration of the partial section of the chipper illustrated in FIGURE 1.

Without the reentrant surface 44 the cutting tip 40 would be free to rotate about the point 48 in the cross section of the cutter blade 18 due to the forces 52 except for the relatively small resistive forces offered by the tensile strength of the carbide or bonding means therefor along the surface 54 of the recess 42 and a similarly small shear force along the surface 44 of the recess 42.

The tensile forces on the surface 54 represented by the small arrows 56 and the shearing forces on surface 44 represented by the arrow 58 would be present in the construction illustrated in FIGURE 3 and would be somewhat greater than they would be if the surface 44 were not reentrant since the surfaces are made longer by the reentrant feature of the surface 44. These forces are further added to in the construction of FIGURE 3 by the additional compressive force represented by the arrows 46 due to the reentrant nature of the surface 44. Thus with the tip provided in accordance with the invention, as illustrated in FIGURE 3, the danger of the cutting tip becoming separated from the body portion 38 of the blade 18 is substantially eliminated.

In addition, the cutting tip 40 illustrated in FIGURE 3 is provided with relatively short sections, three of which, 60, 62 and 64, are illustrated in FIGURE 2. Thus should a section of the carbide cutting tip of a blade 18 be broken or otherwise damaged, a single section thereof may be replaced so that maintenance cost and time are substantially reduced.

Further in accordance with the invention the cutting tip 40 may have its cutting edge 50 serrated as shown in FIGURES 4 and 5. The serrations of FIGURE 4 are particularly designed to provide maximum strength in that adjacent edges 66 and 68 make an angle of ninety degrees with each other and are separated by a flat land 70 so that no sharp point which would tend to chip off or break is provided. Further, it will be noted that to prevent formation of weak points in the individual serrations at the juncture of two of the separate sections, such as 60, 62 and 64, each of the separate sections is provided with a complete serration at the edge thereof rather than a portion of a serration.

The S-shaped serrations 72 of FIGURE 5 are similarly constructed to provide maximum strength to eliminate excessive wear of and damage to the cutting tips of the blades.

The cutter bar 24 is secured to a stationary portion 74 of the chipper by bolt 76 as illustrated in FIGURE 1. Cutter bar 24 is provided with a carbide cutting edge 78 secured thereto by convenient means such as brazing and entending the full length of the cutter bar. Thus in accordance with the invention both cutting edges are carbide for longer service, greater economy, increased production and less sharpening.

The modified cutter bar 80 illustrated in FIGURE 6 is provided with four carbide cutting edges 82. Thus on turning the bar over and/or around a new carbide cutting edge is provided. Crossed bolt holes 84 are provided to facilitate installation of the cutter bar 80 in any position thereof.

Which one embodiment of the present invention and modifications thereof have been considered in detail it will be understood that other modifications thereof are contemplated. It is therefore the intention to include all such modifications and embodiments as come within the terms of the appended claims within the scope of the invention.

What I claim as my invention is:

1. A chipper for chipping brush and the like, including a rotatable cylinder, a pressure plate located adjacent said cylinder, a cutter blade secured to said cylinder and having a carbide cutting tip secured thereto for chipping material positioned between said rotatable cylinder and pressure plate during rotation of said rotatable cylinder, and a cutter bar located at an edge of said pressure plate and adjacent said cylinder, said cutter bar being an elongated substantially rectangular bar and being provided throughout its full length at the edges thereof with separate carbide cutting edges for coaction with the carbide cutting tip on said cutter blade to facilitate cutting during rotation of said rotatable cylinder.

2. A chipper for chipping brush and the like, comprising a rotatable cylinder having a recess in the periphery thereof, a pressure plate adjacent said cylinder, a cutter blade within and projecting outwardly from said recess including a substantially flat elongated body provided at its outer edge with an upwardly inclined portion and an outwardly opening recess, said recess in said cutter blade having a substantially flat longitudinally extending inner surface and having at the inner end of said longitudinally extending surface an upwardly inclined transversely extending surface substantially parallel to the upwardly inclined portion of said cutter blade, said cutter blade being provided at its outer end with a cutting tip for chipping material positioned between said rotatable cylinder and pressure plate during rotation of said rotatable cylinder anchored within said recess in said cutter blade and having substantially parallel inner and outer side surfaces substantially parallel to said longitudinally extending inner surface and having substantially parallel inclined inner and outer edges substantially parallel to said transversely extending surface, the inclined outer edge of said cutting tip being substantially in alignment with and forming a continuation of the upwardly inclined portion of said body and merging with the outer side surface of said cutting tip to form a cutting edge, means in said cylinder for adjusting said cutter blade to position said cutting tip in a predetermined position relative to the periphery of said cylinder, means in said recess in said cylinder for holding said cutter blade in an adjusted position, and a cutter bar extending along an edge of said pressure plate and provided with a cutting edge for coaction with the cutting tip aforesaid to facilitate cutting during rotation of said cylinder.

3. Structure as set forth in claim 2, wherein the cutting tip is provided with relatively short individually removable sections, whereby any one of said sections may be replaced.

References Cited by the Examiner

UNITED STATES PATENTS

| | | | |
|---|---|---|---|
| 1,013,611 | 1/12 | Peters | 146—118 X |
| 1,449,264 | 3/23 | Cannard et al. | 83—349 X |
| 1,973,169 | 9/34 | Ielfield | 241—221 X |
| 2,671,947 | 3/54 | Vander Linde. | |
| 2,781,068 | 2/57 | Anderson | 144—241 XR |
| 2,857,111 | 10/58 | Clark | 241—294 |
| 2,860,678 | 11/58 | Condon et al. | 146—117 |
| 2,873,923 | 2/59 | Bergman | 241—294 X |
| 3,027,106 | 3/62 | Brooks | 241—294 |
| 3,037,540 | 6/62 | Bloomquist et al. | 241—294 X |

J. SPENCER OVERHOLSER, *Primary Examiner.*

JOHN C. CHRISTIE, *Examiner.*